United States Patent
De Carlo et al.

[15] 3,690,054
[45] Sept. 12, 1972

[54] CATCHER FRAME FOR HARVESTER

[72] Inventors: Angelo N. De Carlo, 10596A Main St.; Vito G. De Carlo, 11180 Mile Block Rd., both of Collins, N.Y. 14111

[22] Filed: Aug. 11, 1970

[21] Appl. No.: 62,788

[52] U.S. Cl. ................................................56/330
[51] Int. Cl. ..............................................A01g 19/00
[58] Field of Search ....................56/328 R, 329, 330

[56] References Cited

UNITED STATES PATENTS

| 3,225,894 | 12/1965 | Weygandt et al. | 56/330 X |
| 3,449,895 | 6/1969 | Pertics | 56/330 |
| 3,538,694 | 11/1970 | Holloway | 56/330 |

*Primary Examiner*—Louis G. Mancene
*Assistant Examiner*—J. A. Oliff
*Attorney*—Bean & Bean

[57] ABSTRACT

A harvester catcher frame including a plurality of flexible catcher plates individually mounted on the frame of the harvester for both pivotal and vertical swinging movement by coil springs.

The catcher plates are dimensioned and arranged such as to minimize the area of an opening created between the plates due to engagement thereof with an obstacle, such as a trellis post or the like.

11 Claims, 5 Drawing Figures

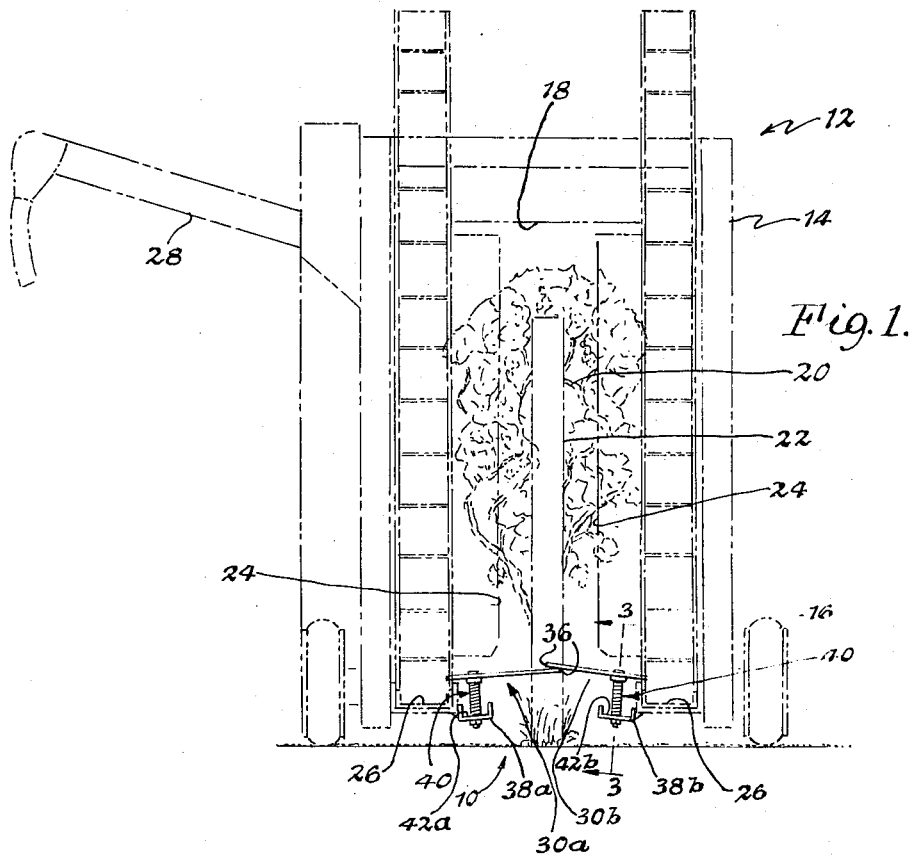
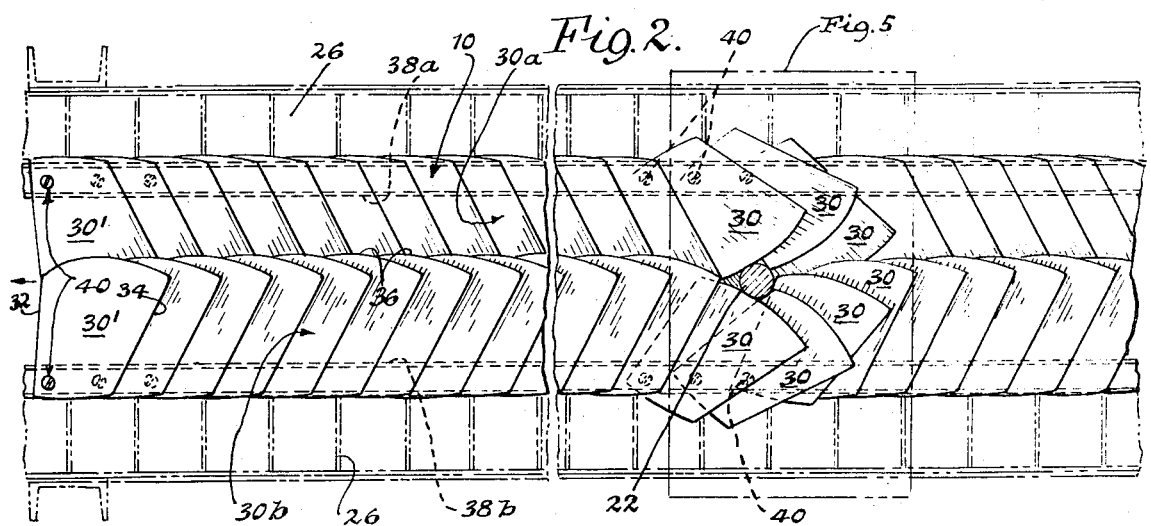
INVENTORS
ANGELO N. DeCARLO
VITO G. DeCARLO
BY
Bean + Bean
ATTORNEYS

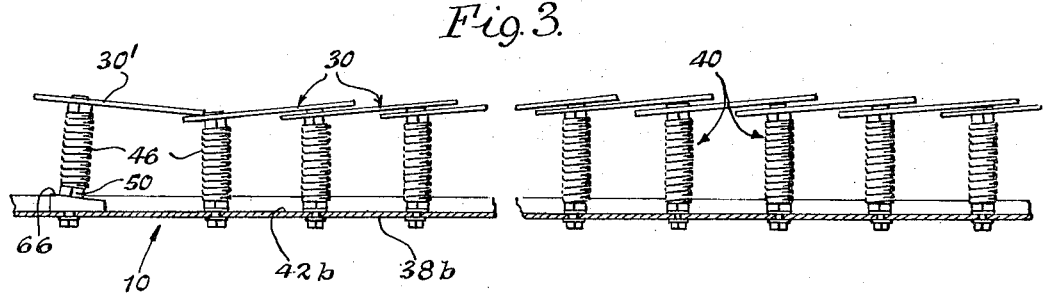
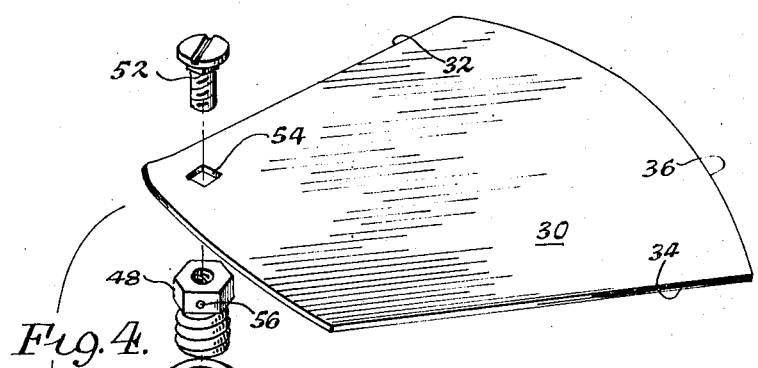
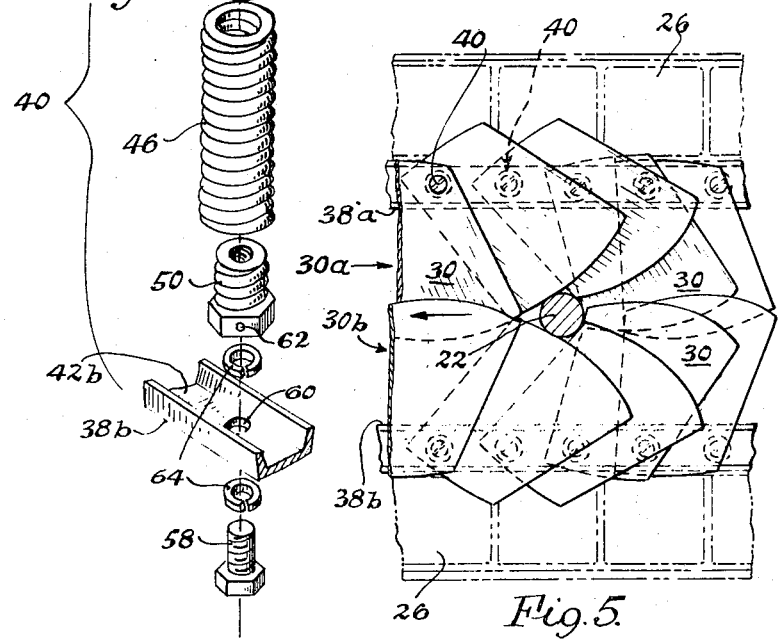

3,690,054

CATCHER FRAME FOR HARVESTER

BACKGROUND OF THE INVENTION

Various forms of apparatus adapted for the automatic harvesting of produce from plants, such as vines, bushes and trees, are well known. Conventionally, such apparatus is in the form of a self-propelled or drawn machine having a frame formed with a lengthwise extending opening to permit the frame to straddle a plant or row of plants to be harvested; frame mounted shakers, beaters or the like which serve to remove produce from the plant; and a mechanism mounted within the frame opening for catching the removed or harvested produce before it falls to the ground.

The most common catching mechanism includes a plurality of catcher plates, which are arranged in a pair of spaced rows extending in the direction of machine travel and supported for pivotable movement from their normal produce catching position, when engaged with an obstacle, such as a trellis supporting post or the trunk of the plant being harvested. Three marked drawbacks of such prior catcher plate constructions have been their relatively high cost, their susceptibility to failure under operating conditions and their degree of inefficiency.

SUMMARY OF THE INVENTION

The present invention relates to an improved produce catching mechanism for use in automatic harvesting machines, which overcomes the disadvantages of prior catching mechanisms.

It is an object of this present invention to provide a produce catching mechanism which employs relatively low cost catcher plates, which are mounted such that failure of the plates under normal operating conditions is substantially eliminated.

A further object of the present invention is to provide novely configurated catcher plates, which are mounted such that loss of produce occasioned by engagement of the plates with an obstacle is reduced to a minimum.

The catching mechanism of the present invention features the utilization of coil springs to mount catching plates formed of a flexible material, such as plastic in flat sheet form, for substantially universal movement, such that the plates are free to move vertically as well as in fore and aft direction upon engagement with an obstacle. As a result, the plates when engaged with an obstacle are not subject to destructive bending conditions, which would otherwise result when the machine moves up and down over rough ground.

Also, by employing flexible plates in flat sheet form mounted by coil springs, the plates are readily maintained in produce loss sealing engagement, while being freely movable in relation to one another when engaged by an obstacle.

DRAWINGS

The nature and mode of operation of the present invention will be more fully described in the following detailed description taken with the accompanying drawings wherein:

FIG. 1 is a front elevational view of the produce catcher mechanism of the present invention showing it in relation to a conventional harvesting machine;

FIG. 2 is a top plan view of the catcher mechanism;

FIG. 3 is a sectional view taken generally along the line 3—3 in FIG. 1;

FIG. 4 is an exploded, perspective view of a catcher plate and mounting therefor; and FIG. 5 is an enlarged view of the area designated as FIG. 5 in FIG. 2.

DETAILED DESCRIPTION

Now referring more particularly to FIG. 1, the produce catching mechanism of the present invention is designated as 10 and shown in association with an automatic produce harvesting machine 12, which may be self-powered or drawn, as desired.

Machine 12, which may be of any desired construction, is shown for purposes of illustration as including a frame 14 mounted for movement relative to plants to be harvested by wheels 16. Frame 14 is formed with a lengthwise extending through opening 18 to permit the frame to straddle plants to be harvested, such as a grape vine 20 supported by a trellis having supporting posts 22. As is conventional, shakers, beaters or the like devices 24, which are mounted on frame 14 within opening 18, serve to remove produce from their plants; the removed produce failing by gravity onto mechanism 10, which serves to direct or guide such produce into collection conveyors 26 for subsequent transfer to collection vehicle, not shown, through a suitable discharge 28.

Mechanism 10 is shown in the drawings as generally including a plurality of catching plates 30, and an arrangement for mounting plates 30 on frame 14 in a pair of rows 30a and 30b, which extend lengthwise of the frame within opening 18 in alignment with the direction of machine travel.

Plates 30 are of identical construction and characterized as having leasing, trailing and free edge portions 32, 34 and 36 respectively. In the preferred arrangement illustrated in the drawings, the leading edge portions of the plates of each row are arranged in underlying relationship with the trailing edge portions of preceding adjacent plates, and the free edge portions of the plates of row 30a are arranged in underlying relationship with like portions of row 30b. As will be apparent from viewing FIG. 2, plates of rows 30a, 30b normally cooperate to form an unbroken surface for catching and diverting harvested produce, but may be moved relative to each other to accommodate for passage of an obstacle, such as supporting posts 22 therebetween, as the machine moves relative to a plant or row of plants being harvested. Preferably, plates 30 are formed of a flexible material, such as plastic in flat sheet form.

The arrangement for mounting plates 30 includes a pair of parallel, rigid U-shaped channel members 38a and 38b, which are suitably fixed to frame 14 one adjacent each of conveyors 26, and individual resilient plate mounting devices 40. As will be apparent from viewing FIG. 1, channel members 38a and 38b are tilted, such that their upwardly facing mounting surfaces 42a, 42b are inclined upwardly and inwardly in a direction transversely of the direction of machine travel. The tilting of channel members 38a, 30b results in the tilting of the plates of rows 30a, 30b in opposite directions transversely of the path of machine travel, thereby causing produce to roll or slide downwardly onto conveyors 26. Preferably, the lapping free end portion 36 of the plates of rows 30a, 30b are maintained in surface abutting engagement by devices 40 to be now described, in order to prevent loss of produce between the rows.

Referring particularly to FIG. 4, it will be understood that mounting devices 40 each include a coil spring element 46 and end fittings 48 and 50 by which spring element 46 is removably fixed to plates 30 and to one or the other of channel members 38a, 38b, respectively. More particularly, fitting 48 is threadably fitted into the upper end of spring element 46 and fixed to plate 30 by threaded bolt 52, which is received within squared plate aperture 54 and locked within the fitting by set screw 56. In a like fashion, fitting 50 is threadably fitted into the lower end of spring element 46 and fixed in surface engagement with the mounting surface of a channel member, such as member 38b, by threaded bolt 58, which is received within channel member aperture 60 and locked within the fitting by set screw 62. When plates 30 are formed of a plastic material, the clamping pressure exerted by bolt 52 is normally sufficient to prevent rotation of the plate relation to fitting 48. However, due to the metal to metal contact between fittings 50 and the channel members, it is normally necessary to provide conventional lock washers 64 to prevent rotation therebetween.

By referring particularly to FIG. 3, it will be understood that fittings 50 of the mounting devices for the leading plates 30' of the plate rows are spaced from their channel mounting surfaces by apertured wedge devices 66, with the result that spring elements 46 tend to maintain leading plates 30' downwardly and rearwardly inclined relative to the direction of machine travel. On the other hand, the spring elements mounting the remaining or relatively rearward plates 30 tend to maintain same horizontal relative to such direction of travel. As a result of the above arrangement, the lapping leading and trailing edge portions of adjacent plates are resiliently maintained in produce loss-sealing engagement, and the plates rearwardly of leading plates 30' are tilted downwardly and forwardly against the bias of coil springs 46. The tilting of leading plates 30' and rearward plates 30 relatively towards one another, effectively serves to prevent loss of produce in a direction lengthwise of machine 12.

Also, coil springs 46 perform the function of permitting plates 30 to pivot in fore and aft direction relative to the direction of machine travel to permit passage of an obstacle between rows 30a, 30b, as indicated in FIGS. 2 and 5, and to move or pivot in a vertical direction when the machine lurches or moves vertically or sidewise relative to the engaged obstacle due to uneven ground conditions. Thus, springs 46 permit plates 30 to freely adjust themselves under operating conditions, and serve to resiliently absorb stresses which might otherwise result in deformation of the plates or their mountings, and damage to a trellis post or trunk of a plant being harvested. The likelihood of damage to the plates and/or the obstacles with which they are engaged is further reduced when the plates are formed of a resiliently deformable plastic sheet material.

An additional feature of the present invention is the configuration of plates 30, which results in a minimum sized produce-loss opening being created between the plates, due to passage of an obstacle between rows 30a, 30b. Specifically, free end portion 36 is provided with a smoothly curved edge surface whose distance from plate aperture 54 progressively increases from leading edge portion 32 towards trailing edge portion 34. As a result, end portions 36 are resiliently maintained in continuous frictional engagement with the surface of the engaged obstacle during return pivotal movement of the plates to their normal non-deflected positions. By preventing snap back of plates 30, each plate has a greater period of effectiveness and overtravel of the plate upon return movement, which might result in a space being created between adjacent plates is prevented.

Movement of plates 30 between their normal and deflected or pivoted positions shown in FIGS. 2 and 5 is facilitated by inwardly and rearwardly inclining the leading edge portion 32 of the plates at an angle of between 10° and 15°, as best shown in the case of plates 30' in FIG. 2.

The catching mechanism of the present invention has been found particularly suitable for use in the harvesting of grapes supported by a trellis having supporting posts measuring upwards of about 6 inches in diameter. It is, however, anticipated that the mechanism of the present invention will possess utility in machines adapted for harvesting diverse produce including fruits and berries from their plants.

We claim:

1. In a machine for harvesting produce from plants including a frame adapted for movement in straddling relationship to said plants, means on said frame for removing produce from said plants and a mechanism on said frame for catching said removed product, the improvement wherein said catching mechanism comprises:

a plurality of produce catching plates; and means for mounting said plates on said frame in a pair of spaced rows extending lengthwise of said frame in alignment with the direction of machine travel, said plates in each said row having leading and trailing edge portions normally arranged in lapping relationship with adjacent plates of said row and free end portions normally arranged adjacent free end portions of plates of the other of said rows, said mounting means including resilient means for mounting said plates for at least horizontal pivotal movements and vertical swinging movements relative to each other and said frame while tending to resiliently maintain said plates arranged as aforesaid.

2. An apparatus according to claim 1, wherein said resilient means mount said plates for substantially universal movement and said plates are formed of resiliently deformable material.

3. An apparatus according to claim 1, wherein said resilient means are coil springs, said coil springs having first ends thereof fixedly connected to said plates and having second ends thereof fixedly connected to said frame.

4. An improvement according to claim 1, wherein said resilient means mounting leading plates of said rows tend to maintain said leading plates downwardly and rearwardly inclined relative to said direction of travel, said resilient means mounting plates disposed rearwardly of said leading plates tend to maintain such rearwardly disposed plates horizontal relative to said direction of travel, said rearwardly disposed plates being maintained in a downwardly and forwardly inclined position relative to said direction of travel against the bias of their associated resilient means by abutting engagement of the upwardly facing surface of said leading edge portion thereof with the downwardly facing surface of said trailing edge portion of an adjacent plate.

5. An apparatus according to claim 4, wherein said resilient means are coil springs.

6. An apparatus according to claim 5, wherein said plates are formed of resiliently deformable plastic material in flat sheet form.

7. An apparatus according to claim 4, wherein said free end portions of plates of said rows are arranged in a lapping relationship and said resilient means tends to bias said lapping free end portions into surface engagement.

8. An apparatus according to claim 7, wherein said resilient means are coil springs, said coil springs having upper ends thereof fixedly connected to said plates and having lower ends thereof fixedly connected to said frame, and said plates are formed of resiliently deformable material in flat sheet form.

9. An apparatus according to claim 1, wherein said free end portions of plates of said rows are arranged in a lapping relationship, said resilient means are coil springs, and said mounting means also includes a pair of parallel, rigid channel members fixed to said frame, said channel members extending lengthwise of said frame and having mounting surfaces inclined upwardly and inwardly in a direction transversely of said direction of travel, said coil springs having lower ends thereof individually fixed to said mounting surfaces and having upper ends thereof fixed to said plates, said coil springs tending to maintain said plates parallel to said mounting surfaces when viewed along said direction of travel with said free end portions in surface engagement.

10. An apparatus according to claim 1, wherein said free end portions of plates have convex smoothly curved edges and are arranged in lapping relationship with free end portions of plates of the other of said rows, said resilient means are fixed to said plates adjacent said leading edges thereof at points remote from said free end portions thereof, the distance between said points and said curved edges increasing progressively from said leading edge to said trailing edge portions, and said resilient means tends to normally maintain said plates in position wherein said leading edge portions are rearwardly and inwardly inclined at an angle of between about 10° and 15° relative to a line extending transversely of said direction of travel.

11. An apparatus according to claim 10, wherein said resilient means tends to maintain lapping free end portions of said plates of said rows in surface engagement and tends to maintain lapping leading and trailing edge portions of adjacent plates of each said row in surface engagement, and said plates are formed of a resiliently deformable plastic material in flat sheet form.

* * * * *

UNITED STATES PATENT OFFICE
CERTIFICATE OF CORRECTION

Patent No. 3,690,054　　　　　　　　Dated September 12, 1972

Inventor(s) Angelo N. De Carlo, et. al.

It is certified that error appears in the above-identified patent and that said Letters Patent are hereby corrected as shown below:

Column 2, line 25, "failing" should read -- falling -- ; line 37, "leasing" should read -- leading -- ; and line 68, "30b" should read -- 38b -- .

Signed and sealed this 20th day of March 1973.

(SEAL)
Attest:

EDWARD M. FLETCHER, JR.　　　　　　ROBERT GOTTSCHALK
Attesting Officer　　　　　　　　　Commissioner of Patents